United States Patent [19]

Verdier

[11] Patent Number: 5,110,540
[45] Date of Patent: May 5, 1992

[54] GRID FOR A NUCLEAR ASSEMBLY

[75] Inventor: Michel Verdier, Villeurbanne, France

[73] Assignee: Frametome & Compagnie Generale Des Matieres Nucleaires, France

[21] Appl. No.: 482,804

[22] Filed: Feb. 21, 1990

[30] Foreign Application Priority Data

Feb. 21, 1989 [FR] France ................. 8902242

[51] Int. Cl.$^5$ .............................................. G21C 3/34
[52] U.S. Cl. .................................... 376/441; 376/446
[58] Field of Search ............... 376/441, 442, 446, 261

[56] References Cited

U.S. PATENT DOCUMENTS

| 4,651,403 | 3/1987 | DeMario et al. | 376/261 |
| 4,844,862 | 7/1989 | Sartor | 376/441 |

FOREIGN PATENT DOCUMENTS 0196609 10/1986 European Pat. Off. .

Primary Examiner—Daniel D. Wasil
Attorney, Agent, or Firm—Pollock, Vande Sande and Priddy

[57] ABSTRACT

A spacer grid for a nuclear fuel assembly comprises a plurality of sets of plates which are interleaved and mutually interconnected to define cells each for receiving a fuel rod and further comprising a plurality of hairpin springs each carried by and retained on a respective one of the plates and each projecting into at least one respective cell when in released condition. Each spring is provided with one or two retention spurs arranged for retaining it temporarily in a retracted condition with respect to the respective plate. The retention spurs are releasable by a force of predetermined direction applied on the spring.

8 Claims, 1 Drawing Sheet

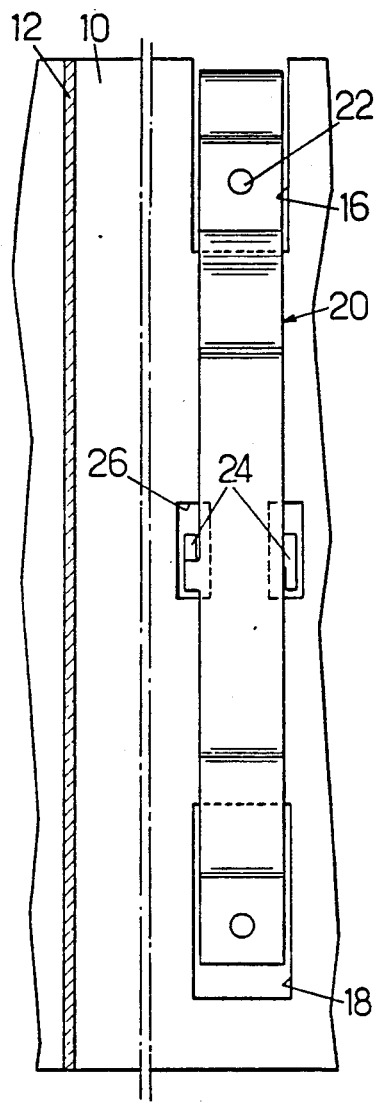
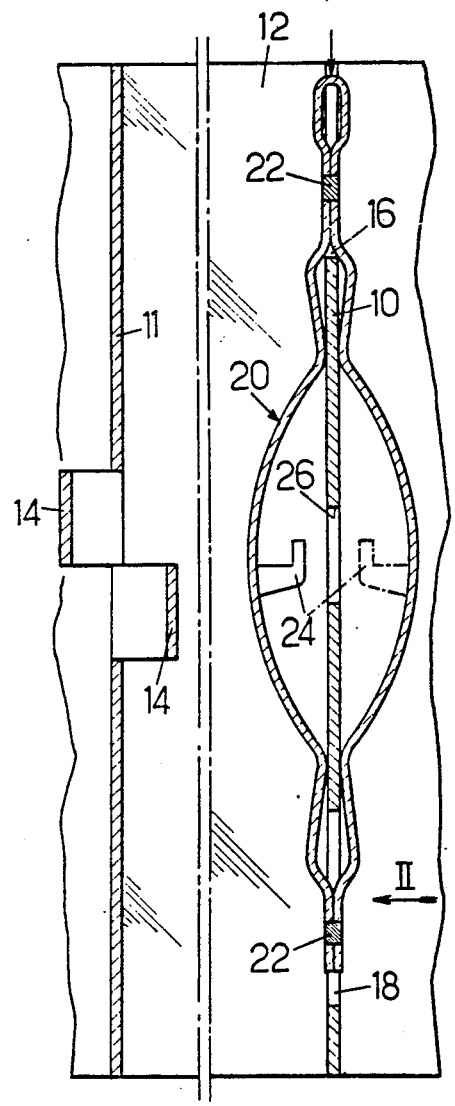
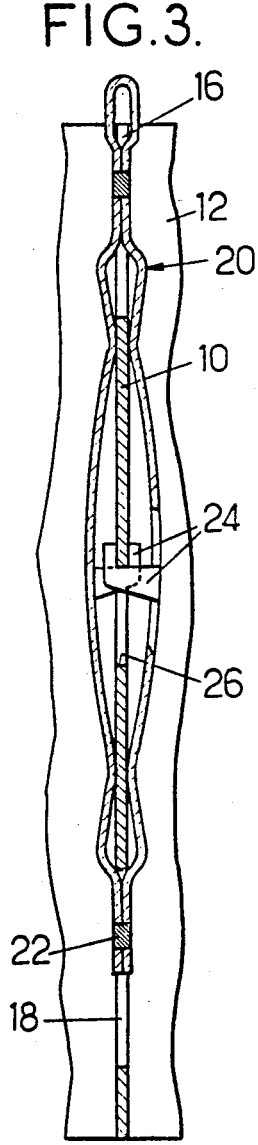
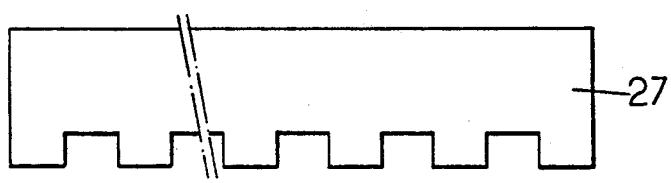

GRID FOR A NUCLEAR ASSEMBLY

BACKGROUND OF THE INVENTION

1. Technical Field

The invention relates to spacer grids for a nuclear fuel assembly, of the type comprising two sets of intersecting plates for defining fuel rod reception cells. Such grids are used for retaining the rods at the nodal points of a regular array, square or triangular. To retain the grids on the rods while allowing the latter to slide upon differential expansion of the rods with respect to each other or with respect to tie rods or guide thimbles on which the grids are fixed, the plates are generally provided with springs which each apply the rods against a fixed boss or dimple of the plate opposite the one carrying the spring, or against another spring.

When the fuel rods are inserted directly in the grids of an assembly, it is necessary to exert thereon an insertion force which is greater than the friction force exerted by the springs. Caution must be taken not to exert an excessive force, and this increases the time duration for manufacturing the assembly. The friction of the rods on the springs and the bosses may cause scratching unfavorable to the resistance of the sheaths of the rods under irradiation.

2. Prior Art

Attempts have already been made to solve the problem raised by the friction of the fuel rods on the springs. In particular, it has been suggested first to insert a bundle of dummy rods into the grid for forcing back the springs, then to retain the springs in retracted condition with a comb formed of wires of small diameter inserted in the grid before removing the dummy rods and inserting the actual fuel rods (European No. 0 196 609). This solution is complex and it is difficult to correctly insert the set of wires forming the comb in a position in which the wires retain all springs, without jamming.

SUMMARY OF THE INVENTION

A particular object of the invention is to provide an improved spacer grid. It is a more specific object to provide a grid which prevents the springs from rubbing on the rods, during insertion of the latter, while using only simple and straightforward means.

For that purpose, the invention recognizes that it is advantageous for the springs to constitute separate parts, rather than forming an integral part of the plates, for they may then be made of a material selected for its favorable mechanical properties, whereas the plates are made of a different material with a low neutron capture cross-section, for example a zirconium base alloy.

To this end, the invention provides particularly a spacer grid comprising springs, each in the form of a hairpin, carried by some at least of the plates and projecting inside respective cells, for exerting a transverse holding force on the rod placed in the cell, wherein each spring has retention means attached thereto for retaining it temporarily in retracted position with respect to the respective plate, which retention means can be disabled by exerting on the spring a force of predetermined direction and of sufficient value to deform it resiliently.

The retention means may typically be formed as a spur engaging on the respective plate. When the spring is in the form of a U-shaped hairpin having two legs placed each on one side of the plate and connected together through openings in the plate, one at least of the legs may have a spur for engagement on the plate when the spring is in a first longitudinal position, which can be released from the plate by moving the spring in the direction of the fuel rods. The solution may be applied not only to double springs, having two resilient legs bearing on respective rods, but also to springs having a single resilient leg: in the first case, the spurs are offset in the lengthwise direction of the plate (transversely to the direction of the rods).

In general, the hairpin springs connected to the plates comprise a loop. The spring may then be moved in a direction parallel to the rods by pushing or pulling the loop, to free the spur or the spurs with a tool or comb inserted between the rows of fuel rods.

There is further provided a process of fitting rods in a fuel assembly grid, including forming the grid with plates on which the springs are hooked in a retracted position, then pushing the springs to release the retention means and to allow the springs to bear against the rods.

BRIEF DESCRIPTION OF THE DRAWINGS

The invention will be better understood from the following description of a particular embodiment, given by way of example and with reference to the accompanying drawings, in which FIG. 1 is a view of a grid fragment, in cross-section through the axis of a spring, showing a set of two parallel plates one of which is equipped with a spring shown in free (released) condition;

FIG. 2 is a left hand view of FIG. 1;

FIG. 3, similar to FIG. 1, shows the legs of the spring retracted and engaged on the corresponding plate; and FIG. 4 is a diagrammatic view of a tool for releasing springs of the type shown in FIGS. 1 to 3.

DETAILED DESCRIPTION OF A PREFERRED EMBODIMENT

The invention will be described as applied to a grid having a general construction of the type already disclosed in U.S. Pat. No. 4,646,431. The grid is formed of two sets of plates made of a zirconium based alloy, the plates of a same set being parallel to each other and orthogonal to the plates of the other set. The plates of the two sets are interleaved and welded together.

FIGS. 1 and 2 show only two plates 10, 11 belonging to one set and a plate 12 belonging to the other set. Plate 11 comprises embossed portions forming bosses or dimples 14 with which the rods have an abutting contact. Plate 10 has an upper opening 16 and another opening 18 (the latter in the form of a window) at each position receiving a spring 20. The springs exert on the fuel rods forces for retaining or supporting them axially.

The spring shown by way of example is a double U-shaped hairpin spring. The two resilient legs of the spring are mutually connected through the upper opening 16 and the window shaped opening 18, generally by welding spots 22. In general, the springs are made of an alloy with high mechanical strength, for example a chromium-nickel alloy known under the trade mark "INCONEL", while the plates are made of a zirconium base alloy.

The arrangement described up to now is widely used on fuel assembly grids for pressurized water reactors.

According to the invention, means are provided for temporarily retaining the legs of the spring in retracted condition with respect to the corresponding plate.

In the embodiment shown in the drawings, the retention means comprise a spur 24 in the form of a hook formed on each leg at a position such that it may engage on the edge of an opening 26 formed in the plate. Each spur 24 is placed approximately where the leg, in free condition, has a maximum amount of projection into the cell (about 2 mm in a typical grid). The openings 18 and 16 must be formed for allowing the springs to move, in the direction of the fuel rods, between a position in which the spurs may remain engaged on the plate (FIG. 3) and a position in which they are released (FIGS. 1 and 2). When the upper opening 16 is in the form of a notch, as in the case illustrated in the drawings, it is sufficient that the of the lower opening be sufficient size for spring 20 to be movable as far as the engagement position shown in FIG. 3.

Spurs 24 may be formed very simply as lateral extensions of the legs, bent back toward the respective plate: the spurs, placed each on one side of the midplane of the spring, do not interfere with each other.

As illustrated in the drawings, the loop of the U-shaped spring projects above the corresponding plate 12 when the spring is in engaged condition (FIG. 3); it is then very easy to clear the spurs by simply pushing the loops to move them until they are level with upper edges of the plates, with a tool formed of one or more blades or combs, such as comb 27 shown in FIG. 4, for releasing one or more springs simultaneously when the tool is inserted between the fuel rods and exerts an axial force on the loops of the springs, i.e., a force in the direction of the rods.

It is possible to form a single action U-shaped spring in accordance with the invention, in which case then only the resilient leg is provided with a retention spur.

A method of inserting a bundle of fuel rods in a grid of the kind shown in FIGS. 1 to 3 is as follows: each separate plate is first of all fitted with springs, for example using the method described in U.S. Pat. No. 4,530,146 already mentioned. Then the springs of each plate are brought into the locked condition shown in FIG. 3. This operation may be made very simply by forcing the two legs of each spring toward each other until their spacing is sufficiently small for the spurs 24 to straddle plate 10 and then (possibly, by moving a wrench clamping the spring) moving the spring for bringing the spurs into the position shown in FIG. 3; it is then sufficient to release spring 20.

In a typical example, in which the projection at rest of each leg is about 2 mm, spurs may be formed having an engagement surface at a distance of 1.5 mm from the bearing surface of the corresponding leg. Then, the extent of projection of each leg when in engaged condition (FIG. 3) is decreased to about 1.10 mm, the tractive force exerted by each spur being between 4 and 5 daN.

The plates may then be assembled together conventionally, for example using the method described in U.S. Pat. No. 4,530,146.

Once the grid has been assembled, the bundle of rods may be inserted, also in a conventional way except that the retracted springs leave a sufficient clearance to overcome the risks of scratching and scoring the sheaths of the rod. It is possible to adopt a higher loading rate than in the past and/or to insert a larger number of rods simultaneously. Since it is not necessary to exert a considerable force on the rod, the danger of bending is removed, whence an improvement in the identity of the coolant passages between the rods and in the straightness of the fuel assembly.

Once all rods have been positioned, the springs may be unlocked. The operation may take place very simply when, as illustrated in the drawings, the loops of the springs project above the grids when the springs are engaged. It is then sufficient to exert a force on the loops, for example using a comb inserted between the rods, for releasing the legs (FIG. 3). Return of the springs to the position shown in FIGS. 1 and 2, in which they are "embedded" in the grid, indicates that the legs are unlocked.

Numerous modifications are possible regarding the shape of the springs and the nature of the array, which may be triangular as well as square.

I claim:

1. A spacer grid for a nuclear fuel assembly, comprising a plurality of sets of plates which are interleaved and mutually interconnected to define cells each for receiving a fuel rod and further comprising a plurality of hairpin springs each carried by and retained on a respective one of said plates and each having a portion projecting into at least one respective of said cells by a predetermined amount when in released condition for exerting a transverse holding force on one said fuel rod placed in the respective cell, wherein each of said portions of said springs is provided with individual retention means arranged for retaining it temporarily in a retracted condition with respect to the respective plate, said portion of said spring when in retracted condition projecting into the respective cell or cells by an extent less than said predetermined amount and said retention means being individually releasable by a force of predetermined direction applied on the spring.

2. Grid according to claim 1, wherein each of said springs has a looped section which projects above an edge of the receptive plate orthogonal to said predetermined direction when the spring is in retracted condition and said retention means is adapted to be released by a pushing force exerted on said loop in said predetermined direction parallel to said plates.

3. A spacer grid for a nuclear fuel assembly, comprising a plurality of sets of plates which are interleaved and mutually interconnected to define cells each for receiving a fuel rod and further comprising a plurality of hairpin springs each carried by and retained on a respective one of said plates and each projecting into at least a respective one of said cells by a predetermined amount when in released condition for exerting a transverse holding force on one said fuel rod placed in the respective cell, wherein each of said springs is provided with retention means arranged for retaining it temporarily in a retracted condition with respect to the respective plate, said spring when in retracted condition projecting into the respective cell or cells by an extent less than said predetermined amount and said retention means being releasable by a force of predetermined direction applied on the spring, wherein said retention means comprise at least one spur formed on a leg of said hairpin spring, shaped for engaging a respective plate.

4. Grid according to claim 3, wherein said spur is formed on a resilient portion of said spring which projects into said cell by a maximum amount when said spring is in released condition.

5. Grid according to claim 3, wherein each of said spurs consists of a lateral extension of a leg of the respective spring, bent back toward the respective plate.

6. Grid according to claim 3, wherein some at least of said springs have two legs located each on one side of the respective plate, said legs being mutually connected across openings formed in the respective plate, at least one of said legs having one said spur so shaped as to engage the receptive plate when the spring is in a first predetermined longitudinal position and released from the plate upon movement of the spring in a longitudinal direction parallel to the fuel rods.

7. Grid according to claim 6, wherein both legs of each of said some of said springs are resilient and are each provided with a respective one of said spurs, said spurs being mutually offset in a direction orthogonal to the longitudinal direction and being arranged for engagement with an edge of an opening in the respective plate.

8. Grid according to claim 6, wherein said legs are connected by welding across said openings and said openings are sized to permit said movement for releasing the respective spring.

* * * * *